United States Patent Office 3,526,669
Patented Sept. 1, 1970

3,526,669
PROCESS FOR THE MANUFACTURE OF ISO-
PRENYL ALCOHOLS HAVING 9, 11, and 12
ISOPRENE UNITS AND NEW ISOPRENYL
ALCOHOLS
Hideaki Fukawa, Fukuoka-machi, Masashi Toyoda and
Hiroshi Seo, Kawagoe-shi, and Toru Shimizu, Tokyo,
Japan, assignors to Nisshin Flour Milling Co., Ltd.,
Tokyo, Japan, a corporation of Japan
Filed Feb. 21, 1967, Ser. No. 617,654
Claims priority, application Japan, Feb. 22, 1966,
41/10,236; Dec. 9, 1966, 41/80,334
Int. Cl. C07c 29/24, 49/76
U.S. Cl. 260—643                                 5 Claims

ABSTRACT OF THE DISCLOSURE

This invention relates to process for manufacturing and also isolating isoprenyl alcohols having 9, 11 and 12 isoprene units from the saponified matter which is contained in mulberry leaves and silkworm feces. Additionally, this invention relates to new compounds, isoprenyl alcohols having 11 and 12 isoprene units.

---

The present invention relates to a process for the manufacture of isoprenyl alcohols having 9, 11 and 12 isoprene units from mulberry leaves and silkworm feces, and to new isoprenyl alcohols.

The isoprenyl alcohols obtained by the present invention are a substance having the following general formulas:

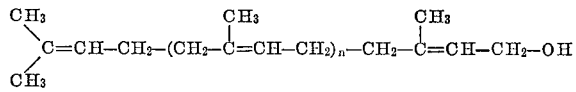

wherein $n$ is 7, 9 and 10, namely isoprenyl alcohols having 9, 11 and 12 isoprene units.

Chemically these isoprenyl alcohols having 9, 11, and 12 isoprene units constitute an isoprene polymer having a regularity of a 1,4-addition and substituted at the terminal with a primary hydroxyl radical.

This isoprene polymer characterizes a side chain composition of a coenzyme Q useful as a medicine and vitamin $K_2$ and is not only an intermediate essential to the synthesis of these substances but is also useful as a medicine.

Such isoprenyl alcohols have been scarcely discovered in the nature. The isoprenyl alcohol which has been confirmed is only solanesol which is isoprenyl alcohol having 9 isoprene units discovered from tobacco leaves by R. L. Rowland et al. "J. Am. Chem. Soc." 78, 4680 (1956). As regards an isoprenyl alcohol having 10 isoprene units, F. W. Hemming et al. have quantitatively presumed the presence of one ingredient of a chromatographic fraction extracted from an unsaponified matter in spadices of an Arum maculatum from only the result of a paper chromatography but have not determined the structure. ("Proc. Roy. Soc., London" B. 158, 291 (1963))

Furthermore it has never been practiced to industrially extract such isoprenyl alcohols. And such isoprenyl alcohols in which the isoprene side chain is very long is so difficult to chemically synthesize that it can not be industrially obtained today.

We have discovered an isoprenyl alcohol fraction having 9, 11 and 12 isoprene units by investigating the composition of an unsaponified matter which has been industrially produced from silkworm feces. As a result of the further investigation, we have succeeded in the isolation and purification of them.

The course for isolating and collecting the isoprenyl alcohol fraction from silkworm feces to determining the structure is as shown in the following, taking in connection with the accompanying drawing, in which.

First of all, an extract obtained by extracting dry silkworm feces with acetone was saponified with methanol-caustic potash and was then extracted with hexane. The thus obtained unsaponified matter fraction was used as a raw material. It was dissolved in hexane or acetone. The solution was subjected to a proper combination of any of a fractional refrigeration precipitation (for example, a deep fractional refrigeration precipitation), molecular distillation and adsorption chromatography using silica gel or active alumina. When the solution was then separated from such impurities as sterol, hydrocarbon, saturated alcohol, carotenoid and phytol while confirming the degree of purification by a thin layer chromatography, a single substance could be obtained.

The thus obtained substance shows a content of 10 to 15% of the unsaponified matter of silkworm feces and is a pure substance in the thin layer chromatography.

In the thin layer chromatography (silica gel), this substance retains such $Rf$ values as are shown in Table 1. It is a light yellow oily liquid at the normal temperature, shows a refractive index of $n_D^{25°}$:1.5112 and becomes white crystals below $-30°$ C. in acetone, ethanol or hexane.

TABLE 1

| Developers: | $Rf$ values |
|---|---|
| Chloroform:methanol (4:1) | 0.84 |
| Isobutanol | 0.61 |
| Chloroform | 0.50 |
| Benzene | 0.48 |
| Chloroform:benzene (1:4) | 0.27 |
| n-hexane | 0.02 |

It is shown in a thin layer chromatography by adsorption that this substance is one spot and is pure isoprenyl alcohol group but it is shown in a reversed phase paper chromatography that this substance can be slightly isolated and contains three isoprenyl alcohols.

That is to say, it contains a comparatively small amount of solanesol of 9 isoprene units and mostly isoprenyl alcohols presumed to be of 11 and 12 isoprene units. These two isoprenyl alcohols show performances very close to each other in the reversed phase paper chromatography and are presumed to be of 11 and 12 isoprene units as calculated from such mean molecular weight, nuclear magnetic resonance absorption spectrum and element analysis value of the present substance as are described later. The $Rf$ values in the reversed phase paper chromatography of this substance are shown in Table 2.

TABLE 2

| Developers | Rf values | | | Solanesol from tobacco leaves |
|---|---|---|---|---|
| | Spot 1 | Spot 2 | Spot 3 | |
| Acetone | 0.66 | 0.72 | 0.77 | 0.77 |
| Acetic acid | 0.35 | 0.47 | 0.62 | 0.62 |
| 90% n-propanol | 0.44 | 0.55 | | |

Fixed phase: Filter paper with the phase reversed with 5% fluid paraffin/n-hexane.

The boiling point of the above-mentioned one spot in a molecular distillating apparatus is 180° to 240° C. at a vacuum degree of $10^{-3}$ mm. Hg. As shown in FIG.

Figure 1:
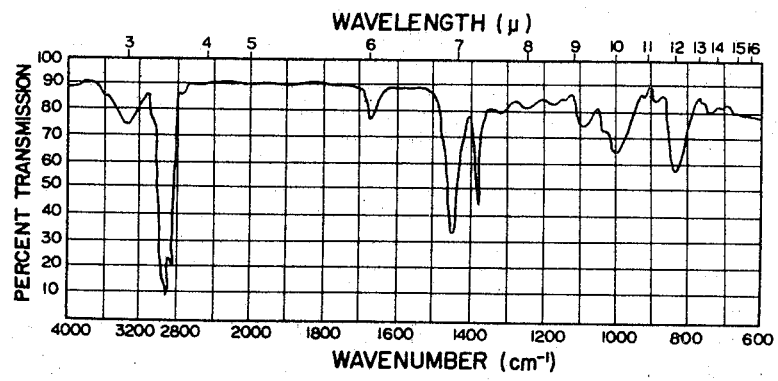
FIG. 1 shows an infrared absorption spectrum of a substance obtained by the present invention.
Figure 2:
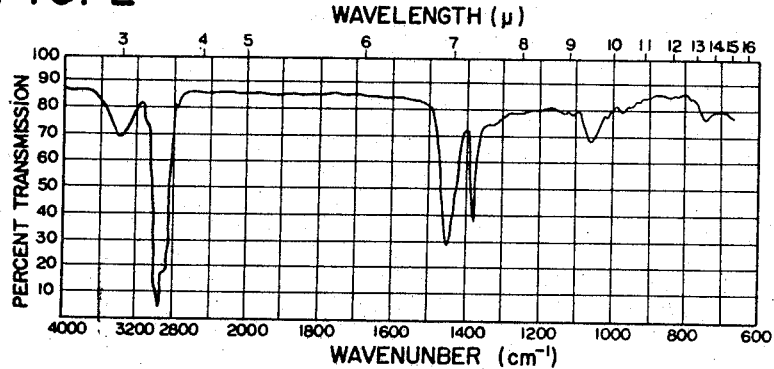
FIG. 2 shows an infrared absorption spectrum in the case that a substance obtained by the present invention was hydrogenated.

1, in the infrared absorption spectrum, it has an absorption of a C=C double bond at 1600 cm.$^{-1}$ and has a hydroxyl radical of —C=C—CH$_2$OH at 1000 cm.$^{-1}$. It is shown that when this substance is hydrogenated the absorption of 1000 cm.$^{-1}$ will shift to 1050 cm.$^{-1}$ and will be of a hydroxyl radical of —CH$_2$—CH$_2$—OH. This fact coincides with the fact confirmed by Rowland et al. in solanesol, phytol and farnesol (see FIG. 2).

Further, the infrared absorption spectrum denies the presence of any other functional radical and ring. No peculiar absorption is present in the ultraviolet part absorption spectrum and visible part absorption spectrum.

The results of the present analysis are as in Table 3. It is shown that this substance is an isoprenyl alcohol group of 11 isoprene units on the average.

TABLE 3

|  | Percent | |
| --- | --- | --- |
|  | Carbon | Hydrogen |
| The present substance (analysis values) | 86.00 | 11.80 |
| C$_{55}$H$_{90}$O (theoretical values of isoprenyl alcohol of 11 isoprene units) | 86.09 | 11.82 |
| Hydrogenated substance of the present substance (analysis values) | 83.74 | 13.95 |
| C$_{55}$H$_{112}$O (theoretical values of the hydrogenated substance of isoprenyl alcohol of 11 isoprene units) | 83.66 | 14.30 |
| Acetylated substance of the present substance (analysis values) | 84.57 | 11.49 |
| C$_{57}$H$_{92}$O$_2$ (theoretical values of the acetylated substance of isoprenyl alcohol of 11 isoprene units) | 84.46 | 11.45 |

The mean molecular weight of the present substance is obtained as 773 by a vapour pressure process and is close to the molecular weight of 766 of an isoprenyl alcohol of 11 isoprene units. When the amount of the absorption of hydrogen at the normal temperature was measured with a platinum catalyst, it was found that 1 mol. of hydrogen was absorbed with 70.5 g. of the present substance.

It has become clear that if the molecular weight is 766, 11 double bonds will be present. That is to say, it is shown that each isoprene unit is not saturated. According to a mass spectrum, in this substance, only a signal group of a number of masses which is a multiple of the isoprene units is recognized. It is confirmed by this fact that the isoprene units are regularly bonded by a 1,4— bond.

Figure 3:
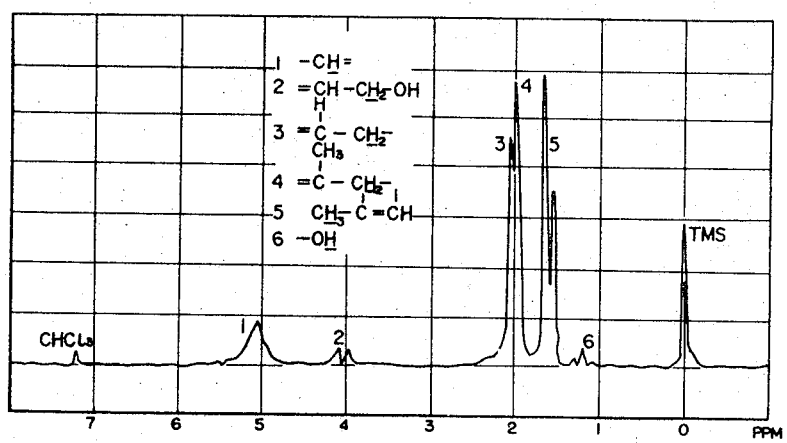
FIG. 3 shows a nuclear magnetic resonance spectrum of a substance obtained by the present invention.

The nuclear magnetic resonance spectrum (of a proton type of 60 megacycles) of the present substance is shown in FIG. 3. Proton signals of a methyn (—CH=), methylene (—CH$_2$—), methyl (=C—CH$_3$), hydroxyl radical (OH) and methylene (=CH—CH$_2$—OH) in the α-position of the hydroxyl radical were detected. In a hydrogenated product of this product, that is, a saturated alcohol, the signal of the methyn will vanish and the proton signal of the hydroxyl magnetic field and will separate into three. From these points and the measurement of the signal strength, it is shown that, even from only the nuclear magnetic resonance spectrum, the present substance is a primary isoprenyl alcohol of 11 isoprene units on the average.

By the above, the present substance has been determined to be a mixture of solanesol of 9 isoprene units and two new 1,4-addition-primary isoprenyl alcohols having 11 and 12 isoprene units.

It is an object of the present invention to provide a process for the manufacture of isoprenyl alcohols having 9, 11 and 12 isoprene units from a raw material containing components of mulberry leaves.

It is another object of the present invention to provide a process for isolating isoprenyl alcohols having 9, 11 and 12 isoprene units.

It is a further object of the present invention to provide new compounds, namely isoprenyl alcohols having 11 and 12 isoprene units.

The present invention is a process for the manufacture of isoprenyl alcohols having 9, 11 and 12 isoprene units characterized in that a raw material containing components of mulberry leaves is treated with an organic solvent which is able to extract a fatty matter therefrom, the fatty matter in the extract is saponified with alkali and the unsaponified matter is separated from the saponified matter and is then purified by at least two of such purification methods as a molecular distillation, fractional refrigeration precipitation and adsorption chromatography.

A general manner wherein the process of the present invention is practiced is explained as follows:

First of all, a fatty matter is extracted from silkworm feces or crushed and dried mulberry leaves with such organic solvents as acetone, chloroform, ether and hexane. The obtained fatty matter is saponified and the unsaponified matter is collected. Usually this step is carried out with caustic potash-methanol. The unsaponified matter is partitioned into a hexane-methanol layer and is washed with 90% methanol and the hexane is distilled away in this step.

The thus obtained unsaponified matter is dissolved in hexane or acetone and is fractionally precipitated while being gradually cooled. The sterol and higher saturated alcohol and hydrocarbons are removed. When the solution is then frozen to be less than —20° C., the isoprenyl alcohols having 9, 11 and 12 isoprene units will be precipitated. And then the precipitate is collected. This operation is carried out once or is repeated. Then it is molecular-distilled at a vacuum degree higher than 10$^{-3}$ mm. Hg to separate such initial fraction as phytol from the isoprenyl alcohols having 9, 11 and 12 isoprene units. Under the above mentioned conditions, the isoprenyl alcohols having 9, 11 and 12 isoprene units will be distilled away at a temperature of 180° to 240° C. In some cases, the distillate is deeply cooled to be precipitated under the above described conditions and is refined by an adsorption chromatography over silica gel or active alumina. For the developer in such case is desirable a nonpolar solvent.

These steps may be combined in any proper order. Therefore, the molecular distillation may be carried out before the deep-cooled precipitation. In some cases, any one of these steps may be omitted. However, in such case, it will be necessary to increase the number of repetitions of the steps to be carried out.

One preferable combination of these steps is a combination of firstly fractional refrigeration precipitation, secondly molecular distillation and finally fractional refrigeration precipitation.

Another preferable combination of these steps is a combination of firstly molecular distillation and finally fractional refrigeration precipitation.

The fractional refrigeration precipitation may be carried out for example in a refrigerator or in a Dry Ice-acetone mixture. The obtained precipitate is separated for example by a low temperature filtration apparatus.

The molecular distillation may be carried out in a conventional apparatus such as for example, a rotary film centrifugal type molecular distillation apparatus.

As examples of the raw material containing components of mulberry leaves which may be used in the process of the present invention, there is mentioned mulberry leaves themselves and silkworm feces.

As examples of the organic solvent which is able to extract a fatty matter from the raw material and which may be used in the process of the present invention, there is mentioned acetone, chloroform, ether and hexane.

The further feature of the present invention is a process for isolating isoprenyl alcohols wherein the unsaponified matter is purified by a fractional refrigeration precipitation, a molecular distillation and then fractional refrigeration precipitation and is further subjected to an adsorption chromatography to isolate isoprenyl alcohols having 9, 11 and 12 isoprene units, respectively.

The another further feature of the present invention is a process for isolating isoprenyl alcohols having 9, 11 and 12 isoprene units wherein the unsaponified matter is purified by a molecular distillation and then fractional refrigeration precipitation and is further subjected to an adsorption chromatography to isolate isoprenyl alcohols having 9, 11 and 12 isoprene units, respectively.

As the result of further investigations for the isolation of isoprenyl alcohol having 9 isoprene units, we have now found that the isoprenyl alcohol having 9 isoprene units can be isolated by dissolving the isoprenyl alcohol mixture in acetone, cooling the obtained solution 0° to −10° C. and crystallizing isoprenyl alcohol having 9 isoprene units only, or alternatively by molecular-distilling the unsaponified matter, dissolving the distillate in benzene, adding the solution with a solution of thiourea in methanol to form an adduct compound of thiourea-isoprenyl alcohol having 9 isoprene units and then decomposing the adduct compound formed with water.

Therefore, the isoprenyl alcohol having 9 isoprene units is preferably isolated by processes wherein the unsaponified matter is purified by a fractional refrigeration precipitation, molecular distillation and then fractional refrigeration precipitation and is further dissolved into acetone and the solution is cooled to a temperature of 0° to −10° C., or wherein the unsaponified matter is purified by a molecular distillation and then fractional refrigeration precipitation and is further dissolved into acetone and the solution is cooled to a temperature of 0° to −10° C., or wherein the unsaponified matter is purified by a molecular distillation and then is treated with thiourea to obtain an adduct compound of thiourea-isoprenyl alcohol having 9 isoprene units and the compound is subjected to an adsorption chromatography to isolate isoprenyl alcohol having 9 isoprene units.

Furthermore, new compound, isoprenyl alcohol having 11 isoprene units is preferably isolated by a process wherein the purified mixture of isoprenyl alcohols having 9, 11 and 12 isoprene units is subjected to an adsorption chromatography by using a silica gel and a suitable developer such as for example 10% (v./v.) ethyl ether containing n-hexane.

And new compound, isoprenyl alcohol having 12 isoprene units is preferably isolated by a process wherein the purified mixture of isoprenyl alcohols have 9, 11 and 12 isoprene units is subjected to an adsorption chromatography by using a silica gel and a suitable developer such as for example 5% (v./v.) ethyl ether containing n-hexane.

The identification of isoprenyl alcohol having 5 isoprene units is carried out as follows:

The purified mixture of isoprenyl alcohols having 9, 11 and 12 isoprene units which was obtained as beforementioned is respectively separated by an adsorption chromatography using a silica gel. A fraction which has been finally eluted is solidified at a normal temperature. The solid is recrystallized from acetone to obtain white crystals, M.P. 38° to 40° C. When white crystals are mixed and melted together with solanesol having 9 isoprene units which was obtained from tobacco leaves by Rowland et al. process, the melting point of white crystals does not decrease and the chromatographic characters and various spectrums of white crystals are quite identical with that of solanesol.

The identification of isoprenyl alcohol having 11 isoprene units is carried out as follows:

The purified mixture is isoprenyl alcohols having 9, 11 and 12 isoprene units is subjected to an adsorption chromatography using a silica gel and a developer for example 10% (v./v.) ethyl ether containing n-hexane. Thus a colorless oily matter is obtained which shows $Rf$ value=0.43 in a reversed phase paper chromatography using N,N′-dimethyl formamide as a solvent and which has a melting point of 9° to 10° C. and a refraction index $n_D^{25°}=1.5094$.

The molecular weight of the oily matter is as follows:

|  | Test (1) | Test (2) |
|---|---|---|
| Found | 772 | 756 |
| Calculated | 7,673 | 767.3 |

Elementary analysis of the oily matter is as follows:
Calculated as $C_5H_{90}O$ (percent): C, 86.09; H, 11.82.
Found (percent): C, 86.11; H, 11.93.

When the oily matter is hydrogenated, it is recognized that 11.0 double bonds are present in the molecular if it is assumed that the molecular weight of the oily matter is 767.3.

Infrared spectrum and nuclear magnetic resonance adsorption spectrum of the oily matter are quite identical with those of the mixture of isoprenyl alcohols. From the above fact, we confirm that the oily matter is undecaisoprenol, namely isoprenyl alcohol having 11 isoprene units.

The identification of isoprenyl alcohol having 12 isoprene units is carried out as follows:

The purified mixture of isoprenyl alcohols having 9, 11 and 12 isoprene units is subjected to adsorption chromatography using a silica gel and a developer for example 5% (v./v.) ethyl ether containing n-hexane. Thus a colorless oily matter is obtained which shows $Rf$ value=0.34 in a reversed phase paper chromatography using N,N′-dimethyl formamide as a solvent and which has a melting point of 15° to 16° C. and a refraction index $n_D^{25°}=1.5095$.

The molecular weight of the oily matter is as follows:

|  | Test (1) | Test (2) |
|---|---|---|
| Found | 837 | 829 |
| Calculated | 835.4 | 835.4 |

Elementary analysis of the oily matter is as follows:
Calculated as $C_{60}H_{98}O$ (percent): C, 86.26; H, 11.82.
Found (percent): C, 86.19; H, 12.00.

When the oily matter is hydrogenated, it is recognized that 12.17 double bonds are present in the molecular if it is assumed that the molecular weight of the oily matter is 835.4.

Infrared spectrum and nuclear magnetic resonance adsorption spectrum of the oily matter are quite identical with those of the mixture of isoprenyl alcohols. From the above fact, we confirm that the oily matter is dodecaisoprenol, namely isoprenyl alcohol having 12 isoprene units.

EXAMPLE 1

140 g. of fatty matter obtained by acetone-extraction from 3.3 kg. of dry silkworm feces was saponified with caustic potash-methanol while a heating was effected at the temperature of 60° C. with an agitation for 2 hours. The whole matter was added with hexane and the hexane phase was well washed with 90% methanol and then water to obtain 100 g. of an unsaponified matter having a reddish brown color. 100 g. of the unsaponified matter were dissolved in n-hexane and the solution was cooled down to 0° C. The precipitated crystals were separated by filtration. The filtrate was distilled to remove n-hexane therefrom. When the obtained residue was dissolved in acetone in a volume 5 times as large and the solution was deep cooled to −40° C., crystals were separated by filtration and the operation was repeated 2 to 3 times to obtain 15 g. of a light yellow oily matter (at the room temperature).

In this oily matter, isoprenyl alcohols and some of sterol were included. This oil matter was molecular-distilled under a vacuum of less than $-10^{-3}$ mm. Hg to collect a fraction of 180° to 240° C. As a result 10 g. of a light yellow oily matter ($n_D^{25°}:1.5110$) were obtained.

It was shown that the light yellow oily matter was a single spot in a thin layer chromatography and that it was a mixture of isoprenyl alcohols in an infrared adsorption spectrum and also nuclear magnetic resonance absorption spectrum.

It was found from the result of a summary analysis of the oily matter by a reversed phase paper chromatography that the oily matter was consisted of about 5% each of isoprenyl alcohols having 11 and 12 isoprene units and about 10% of isoprenyl alcohol having 9 isoprene units.

10 g. of the isoprenyl alcohol mixture were subjected to an adsorption chromatography using 100 g. of silica gel. Using ethylether containing n-hexane as a developer, the mixture was treated with firstly 5% (v.v.) ethyl ether containing n-hexane to isolate the fraction (A) and with secondly 10% (v.v.) ethyl ether containing n-hexane to isolate the fraction (B) and with thirdly 15% (v.v.) ethyl ether containing n-hexane to isolate the fraction (C). Each of the isolated fractions (A), (B) and (C) was treated to remove the solvent and thus 4 g., 4 g. and 0.8 g. respective fractions were obtained.

In order to completely purify each fraction it is necessary to repeat the absorption chromatography, but it can be carried out one time when the operation is carried out very carefully.

It was confirmed by the identification method beforementioned, that the fraction (A) is isoprenyl alcohol having 11 isoprene units and that the fraction (B) is isoprenyl alcohol having 12 isoprene units and that the fraction (C) is isoprenyl alcohol having 9 isoprene units (that is solanesol).

EXAMPLE 2

140 g. of a dark green oily matter obtained by acetone-extracting 400 g. of dry mulberry leaves were saponified with caustic-potash-methanol with a heating. The whole matter was added with hexane and the hexane phase was separated and the separated hexane phase was well washed with 90% methanol to obtain 70 g. of a reddish-brown unsaponified matter.

70 g. of the unsaponified matter were dissolved into a volume 5 times as large and the solution was cooled to $-10°$ C. to precipitate a sterol and the like. The precipitated sterol and the like were separated from the filtrate and the filtrate was cooled to $-35°$ C. to obtain crystals. The crystals were separated from the filtrate and were washed with a cold acetone. Thus 40 g. of crystals which is obtained in a state of orange oily matter at the normal temperature were obtained.

This orange oily matter was molecular-distilled under a vacuum of $10^{-3}$ mm. Hg to collect a fraction which was distilled at a temperature of 180° to 240° C. As a result, 10 g. of an orange oily matter were obtained. The orange oily matter was dissolved in hexane and the solution was cooled to $-40°$ C. to precipitate crystals. Crystals were separated by a filtration to obtain 5 g. of isoprenyl alcohol mixture.

The isoprenyl alcohol mixture was treated by the adsorption chromatography as described in Example 1 and thus 1.5 g. of isoprenyl alcohol having 12 isoprene units, 1.5 g. of isoprenyl alcohol having 11 isoprene units and 0.5 g. of isoprenyl alcohol having 9 isoprene units, respectively.

These obtained isoprenyl alcohols have a property of the isoprenyl alcohols which were obtained from the silkworm feces.

EXAMPLE 3

100 g. of the unsaponified matter which were obtained from the silkworm feces as described in Example 1 were molecular-distilled under a vacuum of $10^{-3}$ mm. Hg to separate a fraction of 180° to 240° C. from phytol and sterol which were distilled at a temperature of less than 180° C. 30 g. of the obtained fraction which were distilled at a temperature of 180° to 240° C. were dissolved in acetone and the solution was cooled to $-35°$ C. to deposit crystals. 25 g. of crystals which are in a state of an orange oily matter at the normal temperature were obtained by a filtration.

The orange oily matter was a mixture of almost pure isoprenyl alcohols. 8 g. of isoprenyl alcohol having 12 isoprene units, 6 g. of isoprenyl alcohol having 11 isoprene units and 1.5 g. of isoprenyl alcohol having 9 isoprene units were obtained by subjecting the above mixture to an adsorption chromatography as described in Example 1.

EXAMPLE 4

10 g. of the isoprenyl alcohol mixture which were obtained in Example 1 were dissolved in acetone in a volume 5 times as large and the solution was cooled to a temperature of 0° to $-10°$ C. to precipitate a crude isoprenyl alcohol having 9 isoprene units. The precipitated crude isoprenyl alcohol having 9 isoprene units was further recrystallized from same solvent as the above to obtain 0.8 g. of isoprenyl alcohol having 9 isoprene units. M.P. about 38° C. When the product was mixed with isoprenyl alcohol which was obtained from tobacco leaves a single spot was obtained even if a reversed phase paper chromatography was carried out.

EXAMPLE 5

10 g. of the isoprenyl alcohol mixture which were obtained in Example 3 were treated with acetone as described in Example 4 to obtain 1 g. of isoprenyl alcohol having 9 isoprene units, M.P. 38° C. It was recognized from an infrared adsorption spectrum and nuclear magnetic resonance adsorption spectrum that the product corresponded to the standard isoprenyl alcohol having 9 isoprene units.

EXAMPLE 6

500 g. of the unsaponified matter which were obtained from a silkworm feces as described in Example 1 were molecular-distilled under a vacuum of $10^{-3}$ mm. Hg to collect a fraction of 180° to 240° C. The fraction was dissolved in 200 ml. of benzene and the solution was poured with 100 ml. of 10% (w./v.) thiourea-methanol solution at the temperature of 20° C. and furthermore was added with benzene until a homogeneous system was obtained. The obtained homogeneous system was left to stand overnight in a refrigerator, and the precipitated crystals were well washed with a cold benzene, and then were decomposed with water and extracted with ether. The extract was washed with water and the solvent was recovered from the extract to obtain 8 g. of a crude isoprenyl alcohol having 9 isoprene units.

When the crude isoprenyl alcohol was subjected to an adsorption chromatography by 50 g. of silica gel and was treated with 10% (v./v.) ether containing n-hexane to isolate 5 g. of pure isoprenyl alcohol having 9 isoprene units.

The pure product was recrystallized from acetone to give crystals having a melting point of 40° C. The product showed a single spot in a thin layer chromatography and also a reversed phase paper chromatography. The infrared adsorption spectrum and nuclear magnetic resonance adsorption spectrum of the product coincided with those described in the literatures before-mentioned.

EXAMPLE 7

600 g. of the unsaponified matter which were obtained from the silkworm feces as described in Example 1 were dissolved in 600 g. of n-hexane and the precipitated crystals were separated from the solution. The filtrate was washed with 10% methanol several times. The n-hexane layer was concentrated and the concentrate was dissolved in acetone and the solution was cooled to 0° C. As a result crystals (consisted of mainly sterol and saturated alcohol) were precipitated and the crystals were filtered from the solution. The filtrate was then cooled to $-40°$ C. and the precipitated crystals were separated by a filtration and then washed with a cold acetone and furthermore was recrystallized under the same conditions as the above. 180 g. of a light yellow oily matter were thus obtained.

The oily matter was subjected to a molecular distillation to collect 100 g. of a fraction which was distilled under a vacuum of $1 \times 10^{-3}$ mm. Hg and at a temperature of 180° to 240° C. And then the fraction was treated with thiourea as described in Example 6 to obtain 5 g. of isoprenyl alcohol having 9 isoprene units.

What we claim is:

1. A process for the manufacture of isoprenyl alcohols having 9, 11 and 12 isoprene units comprising: saponifying with an alkali the fatty matter extracted from silkworm feces or mulberry leaves with an organic solvent separating the unsaponified matter from the saponified matter by adding hexane to the saponification mixture and removing the unsaponified material as a hexane solution, subjecting the unsaponified matter to a fractional crystallization by dissolving in a solvent selected from the group consisting of hexane and acetone and cooling to 0° to −20° C. to divide an uncrystallized portion containing isoprenyl alcohols having 9, 11 and 12 isoprene units and a crystallized portion containing sterol, carotene and saturated alcohols and subjecting the uncrystallized portion to a molecular distillation to obtain a fraction which is distilled out at a temperature of 180° to 240° C.

2. A process as claimed in claim 1 wherein the organic solvent is selected from the group consisting of actone, chloroform, ether and hexane.

3. A process as claimed in claim 1 for isolating isoprenyl alcohols having 9, 11 and 12 isoprene units respectively including subjecting said fraction to an adsorption chromatography to isolate isoprenyl alcohols having 9, 11 and 12 isoprene units, respectively.

4. A process as claimed in claim 1 for isolating isoprenyl alcohol having 9 isoprene units including subjecting said fraction to a fractional refrigeration precipitation, dissolving into acetone and cooling the solution to a temperature 0° to −10° C.

5. A process as claimed in claim 1 for isolating isoprenyl alcohol having 9 isoprene units including contacting said fraction with thiourea to obtain an adduct compound of thiourea-isoprenyl alcohol having 9 isoprene units, subjecting said compound to an adsorption chromatography to isolate isoprenyl alcohol having 9 isoprene units.

References Cited

UNITED STATES PATENTS

| 2,520,716 | 8/1950 | Fetterly. |
| 2,527,602 | 10/1950 | Wall. |
| 2,800,516 | 7/1957 | Wilson. |
| 3,080,384 | 3/1963 | Kofler _____ 260—632 |

FOREIGN PATENTS 137,506  7/1961  U.S.S.R.

OTHER REFERENCES

"Merck Index," 7th ed. (1960), pp. 277, 1102.

Noll et al., "Helv. Chem. Acta.," vol. 43, (1960), pp. 433–8.

Vogel, "Practical Org. Chem.," 3rd ed., (1957), pp. 120–130.

Lynen et al., "Angw. Chem.," vol. 72, (1960), pp. 820–9.

Rowland et al., "J. Am. Chem. Soc.," vol. 78, (1956), pp. 4680 to 4683.

Tamura et al., "Chem. Abstracts," vol. 54, (1960), col. 632.

Inazak et al., "Chem. Abstracts," vol. 47, (1953), cols. 9510–11.

Suzuk et al., "Chem. Abstracts," vol. 54, (1960), col. 7984.

LEON ZITVER, Primary Examiner

J. E. EVANS, Assistant Examiner

U.S. Cl. X.R.

260—632, 591, 642